T. E. WYLIE.
PRUNING SHEARS.
APPLICATION FILED NOV. 21, 1911.
1,074,766.
Patented Oct. 7, 1913.
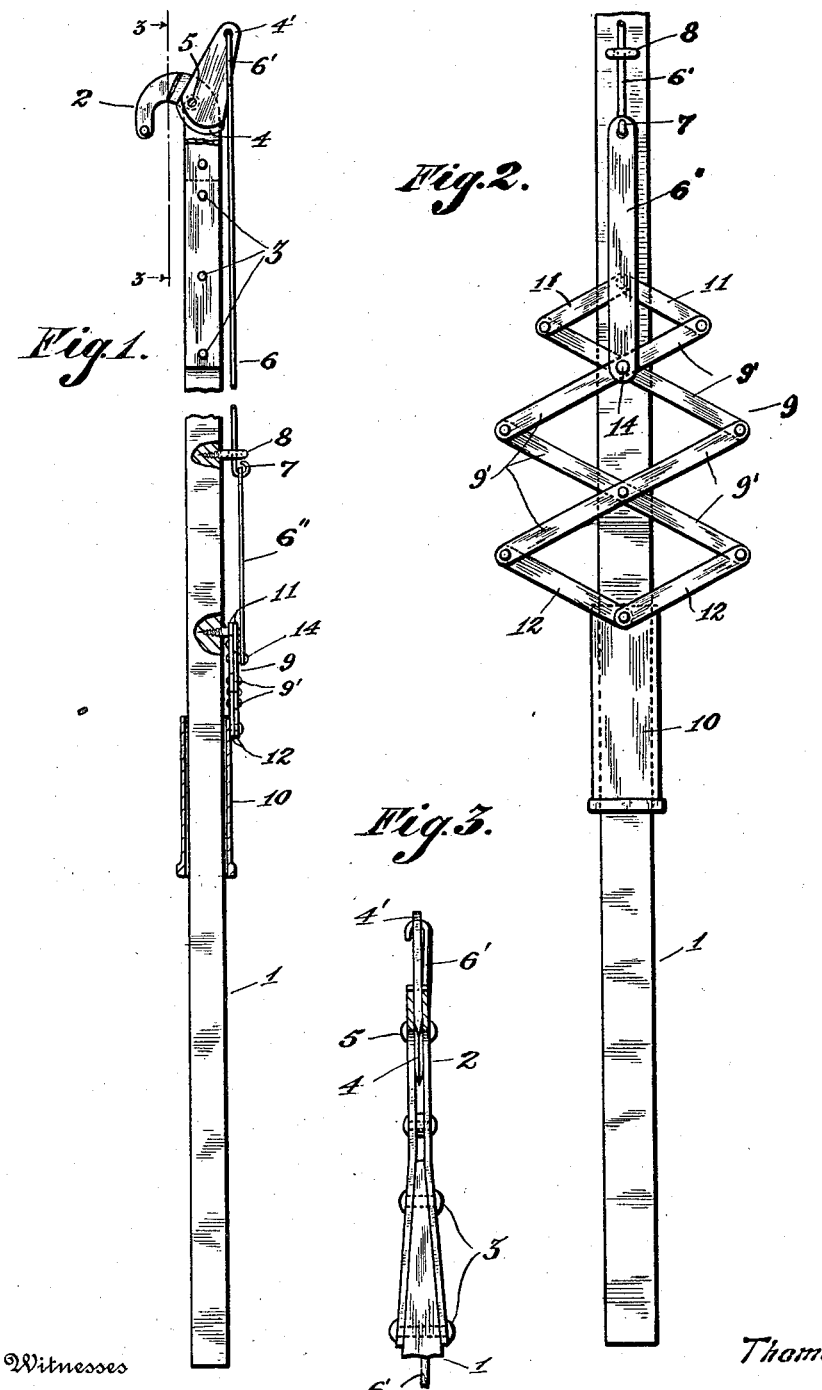
Inventor
Thomas E. Wylie.

UNITED STATES PATENT OFFICE.

THOMAS E. WYLIE, OF SEATTLE, WASHINGTON.

PRUNING-SHEARS.

1,074,766. Specification of Letters Patent. Patented Oct. 7, 1913.

Application filed November 21, 1911. Serial No. 661,630.

*To all whom it may concern:*

Be it known that I, THOMAS E. WYLIE, a citizen of the United States of America, and a resident of the city of Seattle, in the county of King and State of Washington, have invented certain new and useful Improvements in Pruning-Shears, of which the following is a specification.

My invention has for a fundamental object to provide a construction of the above type wherein novel cutting blade operating mechanism, through the medium of which greater leverage is obtained, is provided.

With the above and other objects in view, to be referred to as my description progresses, my invention resides in the features of construction, arrangements and combinations of parts hereinafter described and succinctly defined in my annexed claims.

Referring to the accompanying drawing wherein like numerals of reference indicate like parts throughout: Figure 1 is a side elevation of my invention with the blade in open position, parts being broken away. Fig. 2 is a fragmentary elevation illustrating more particularly the system of levers of the cutter operating mechanism in partially extended position, and Fig. 3 is a fragmentary section taken on line 3—3 of Fig. 1.

Referring to the drawing by numerals of reference, 1 indicates a handle having a hook shaped extension 2, the latter comprising spaced similarly shaped members receiving one end portion of said handle and being secured thereto, as by rivets 3.

Reference numeral 4 indicates a blade or cutter operating between the component members of extension 2 and pivoted thereto, as at 5. Cutter 4 is formed with a rearwardly projecting arm 4' to which the upper section 6' of a driving connection 6 is pivotally connected.

Reference numeral 8 indicates a guide on handle 1 in which the lower end portion of section 6' is freely received. Driving connection 6 is articulated, as at 7, to thereby permit of relative angular movement of its upper section 6' with respect to the lower section 6'' during the angular movement of arm 4', as will be readily understood.

Reference numeral 9 indicates a system of levers for converting a long movement of a sleeve or prime mover 10, slidably mounted on handle 1, into a relatively short movement of blade 4, the intermediate of said levers being pivotally connected in crossed pairs 9' in "lazy tongs" arrangement. The end pairs of these crossed levers are pivotally connected by short levers 11 and 12 to handle 1 and sleeve 10 respectively, as shown. Section 6'' is connected at its lower end portion to the central pivot pin 14 of the uppermost of the intermediate pairs of cross levers. With the blade 4 adjusted, as shown in Fig. 1, extension 2 is engaged over the limb or object to be severed, then sleeve 10 is slid downwardly on handle 1 to extend the system of levers 9 and thereby effect an active operation of blade 4.

Having thus described my invention, what I claim as new, and desire to secure by Letters Patent of the United States of America, is:—

1. A pruning implement comprising a handle, a hook shaped member on one end portion of said handle, a cutting blade pivoted for movement through said member, a pair of pivotally connected crossed levers pivotally supported at one end to said handle, an actuator slide mounted on said handle for movement lengthwise thereof and connected with the free end portion of said system of levers, an articulated driving connection between the intermediate levers of said system and said cutting blade, and a guide on said handle slidably receiving the section of said driving connection connected to said cutting blade.

2. A pruning implement comprising a handle, a fixed member secured thereto, a cutting blade member pivoted for cutting against said member, a pair of pivotally connected crossed levers, means connecting said blade member to the pivotal connection of said cross levers, an actuator slide on said handle, and sets of levers connecting the slide to one terminal of each crossed lever and the opposite terminal of each crossed lever to said handle.

Signed at Seattle, Washington this 10 day of November 1911.

THOMAS E. WYLIE.

Witnesses:
 JAMES E. SPROLL,
 ARLITA ADAMS.

Copies of this patent may be obtained for five cents each, by addressing the "Commissioner of Patents, Washington, D. C."